Figure 1:
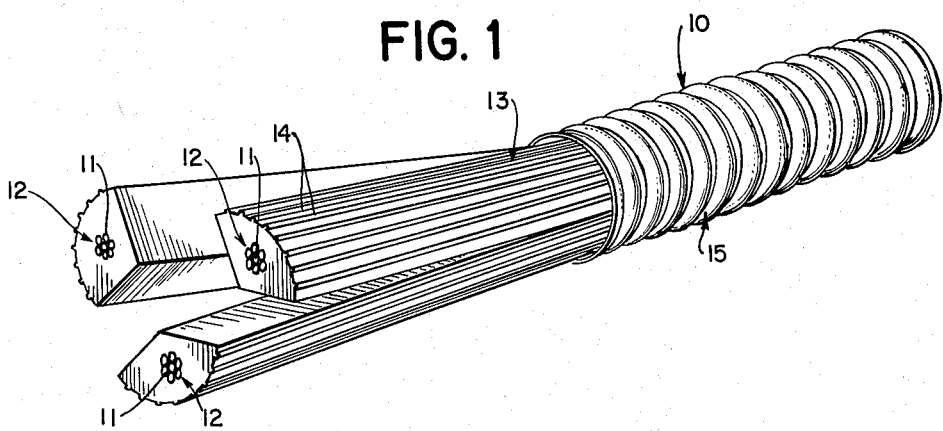

July 5, 1966   C. J. OATESS ET AL   3,259,687
DEEP OIL WELL ELECTRIC CABLE
Filed April 9, 1964

INVENTORS
CECIL J. OATESS
JAMES R. TAYLOR, JR.
BY
ATTORNEYS 3,259,687
DEEP OIL WELL ELECTRIC CABLE
Cecil J. Oatess, Marion, Ind., and James R. Taylor, Jr., Avon Lake, Ohio, assignors to Anaconda Wire and Cable Company, New York, N.Y., a corporation of Delaware
Filed Apr. 9, 1964, Ser. No. 358,594
1 Claim. (Cl. 174—103)

This invention relates to an electrical cable and, more particularly, to a cable for supplying electrical power to submersible pumps in deep oil wells. Cables of this type generally are in constant contact with oil, brine, or other corrosive substances under high pressures and temperatures existing within deep oil wells. To protect the cable under these severe conditions, heavy protective coverings are required in addition to the normal insulation. Accordingly, conventional cables used in deep oil wells have multiple layers of insulation, oil resisting coverings, and an armor outer sheath. A typical cable would consist of three conductors individually insulated with butyl rubber. The covered conductors would then be twisted together and covered with an oil resistant material which also fills the valleys between the conductors. After the conductors and the filler material were adequately bonded together, an interlocking armor would be applied as an outer sheath. While this type of cable fits the requirements for use in deep oil wells, its service may be terminated prematurely due to its multilayer construction. Generally, a flaw or a small break, which may be due to a production defect or an abrading action during service, will allow the oil to come in contact with the insulation material, which under high temperature and pressure will accelerate the deterioration of the insulation rubber to cause a build-up of internal gas pressure between the oil resisting covering and the insulation. Eventually, the gas pressure will be sufficient to rupture the oil resisting jacket.

Several proposed designs were advanced in the past to correct this deficiency in the existing cables for deep oil wells. These designs were either containing deficiencies themselves or were economically not acceptable by the industry.

We have now found that this disadvantage can be overcome using a unique cable construction eliminating the necessity of protective coverings. Broadly stated, the deep oil well cable of this invention comprises at least three conductors, an oil resistant dielectric material surrounding each of these conductors to form a unitary insulated conductor having an equal and uniform cross sectional area in the shape of a sector, the insulated conductors being arranged geometrically to form a cylindrical element, and a metallic protective covering surrounding the element. For a cable with three conductors, the sector cross sectional areas of each insulated conductor is equivalent to one-third of a circle, whereby these elongated sector shape insulated conductors can be combined to form a cylindrical element.

Figure 2:
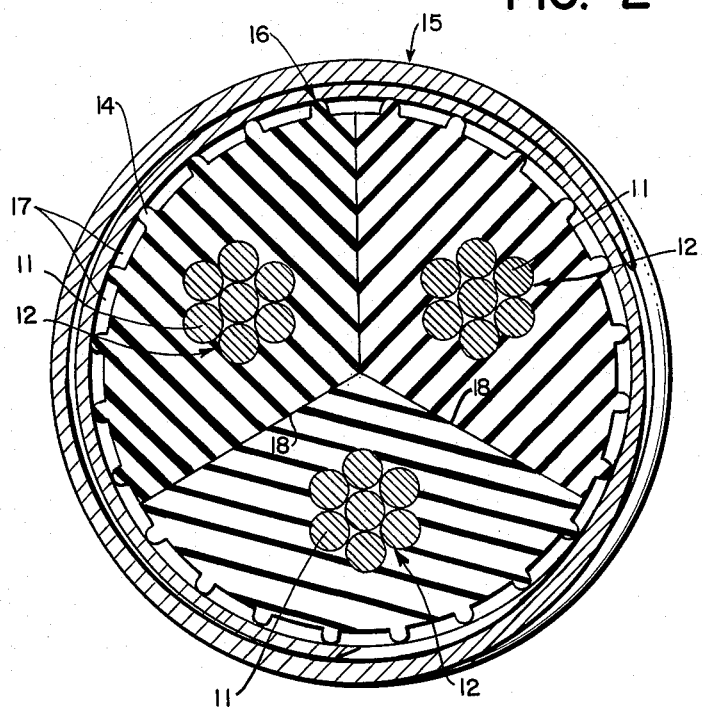

Further to illustrate applicants' invention, a specific embodiment is described hereinbelow with reference to the accompanying drawing wherein FIG. 1 is a perspective view of applicants' deep oil well cable with the end portion of the sheath removed to expose three insulated conductors, and FIG. 2 is a cross section of applicants' cable.

Referring specifically to FIGS. 1 and 2, the cable 10 consists of three conductors 11, each of which is made up of seven stranded copper wires. An oil resistant dielectric material 12 surrounds each of the stranded conductors forming three separate insulated conductors. The dielectric material surrounding the conductors has a cross sectional area in the shape of a sector equivalent to one-third of a circle, which when assembled forms a cylindrical element 13. The oil resistant dielectric material for the insulation may be selected from a number of available synthetic rubbers and plastics. Among the synthetic rubbers, chloroprene polymer and butadiene and acrylonitrile are found to be suitable. The suitable synthetic plastic includes vinyl chloride and vinyl acetate copolymer, tetrafluoroethylene polymer and silicone polymer.

When the cable is submerged or in contact with the oil, the insulation material swells or expands slightly. To compensate for this slight volumetric expansion, it is found to be advantageous to provide longitudinal ribs 14 along the circumference of the cylindrical element 13. These ribs are equally spaced and substantially parallel to each other along the longitudinal axis of the cylindrical element. The assembled sector units are bonded together and protected with an interlocking metal armor sheath 15 which engages the apexes 16 of the ribs 14, leaving an equally spaced longitudinal void 17 between the sheath and the dielectric material. These voids provide the necessary space for the swelling dielectric materials.

The cable of this invention can be conveniently produced by extruding the dielectric material with the stranded wires in a sector shape die. Using a proper die, the longitudinal ribs can be formed as an integral part of the insulation. After they are assembled by engaging the flat intersurfaces 18 to provide a cylindrical element, an interlocking armor sheath 15 can be provided in the conventional fashion.

The unique yet simple construction of applicants' cable provides unexpected advantages. Using a unitary insulation covering from an oil resistant dielectric material, the pressure build-up between interlayers can be completely avoided, thus eliminating a major factor for causing deep oil well cable failure. The flat intersurfaces between sector units enable the cable to maintain its conductors in equal distance from each other, and allows the cable to absorb greater crushing impact without distortion, which contributes to greater power efficiency and less chance for overheating or short circuiting. Furthermore, the sector shape construction completely eliminates the necessity of using filler material to provide a round cable which reduces the cost of the cable and increases the production efficiency.

We claim:

A deep oil well submersible pump cable comprising three conductors, an oil resistant dielectric material surrounding each of said conductors forming a unitary insulated conductor having a uniform cross sectional area in the shape of a sector equivalent to one-third of a circle, said unitary insulated conductors being arranged geometrically to form a cylindrical element with each conductor spaced at equal distance from the others, a plurality of ribs equally spaced around the circumference of said cylindrical element and substantially parallel to each other along the longitudinal axis of the cylindrical element, said ribs being an integral part of said dielectric material, and a metallic protective covering surrounding said element engaging the apexes of said ribs to form a plurality of voids between the insulation and the protective covering to provide expansion space for said insulation.

References Cited by the Examiner

UNITED STATES PATENTS

| | | |
|---|---|---|
| 1,231,568 | 7/1917 | Clark. |
| 2,120,088 | 6/1938 | Carlson _____ 174—113 X |

FOREIGN PATENTS 459,305  8/1949  Canada.

ROBERT K. SCHAEFER, *Primary Examiner.*

JOHN F. BURNS, *Examiner.*

D. A. KETTLESTRINGS, *Assistant Examiner.*